United States Patent [19]

Jinriki et al.

[11] Patent Number: 4,696,202
[45] Date of Patent: Sep. 29, 1987

[54] WRIST MECHANISM FOR INDUSTRIAL ROBOT

[75] Inventors: Tatenori Jinriki, Funabashi; Fusaaki Kozawa, Ibaraki, both of Japan

[73] Assignee: Hitachi, Ltd., Tokyo, Japan

[21] Appl. No.: 857,103

[22] Filed: Apr. 29, 1986

[30] Foreign Application Priority Data

Apr. 30, 1985 [JP] Japan .................. 60-90805

[51] Int. Cl.$^4$ .............................. B66C 1/10
[52] U.S. Cl. .................... 74/479; 414/735; 901/28
[58] Field of Search ............... 901/29, 28, 19; 414/735; 74/469, 479, 640

[56] References Cited

U.S. PATENT DOCUMENTS

| | | | |
|---|---|---|---|
| 3,101,009 | 8/1963 | Musser | 74/640 |
| 3,555,929 | 1/1971 | Hossfeld | 74/640 |
| 3,631,737 | 1/1972 | Wells | 901/28 X |
| 3,667,320 | 6/1972 | Robinson | 74/640 |
| 4,499,784 | 2/1985 | Shum | 74/479 |
| 4,511,305 | 4/1985 | Kawai et al. | 901/29 X |
| 4,666,352 | 1/1986 | Stiff | 74/640 |

FOREIGN PATENT DOCUMENTS 2717870 10/1978 Fed. Rep. of Germany ........ 901/19
2378612 9/1978 France .......................... 901/28

OTHER PUBLICATIONS

"Universal" Mechanisms, Linkages & Mechanical Controls—McGraw Hill ©1965.

*Primary Examiner*—Cornelius J. Husar
*Assistant Examiner*—Joseph A. Fischetti
*Attorney, Agent, or Firm*—Fay, Sharpe, Beall, Fagan, Minnich & McKee

[57] ABSTRACT

Disclosed is a wrist mechanism for an industrial robot which includes a first wrist member disposed rotatably at the tip of a robot arm and a second wrist member movable relative to this first wrist member. The movement of the second wrist member relative to the first wrist member is effected not in a bending mode in which the angle of intersection between the members is variable but in a rotating mode in which the second wrist member becomes rotatable. The transmission of the rotational power to the second wrist member is effected through a universal joint. With this arrangement, such backlashes as are conventionally found in the engagement between gears can be reduced, and the mechanical burden on the universal joint can also be reduced.

11 Claims, 12 Drawing Figures

FIG. 11
FIG. 12
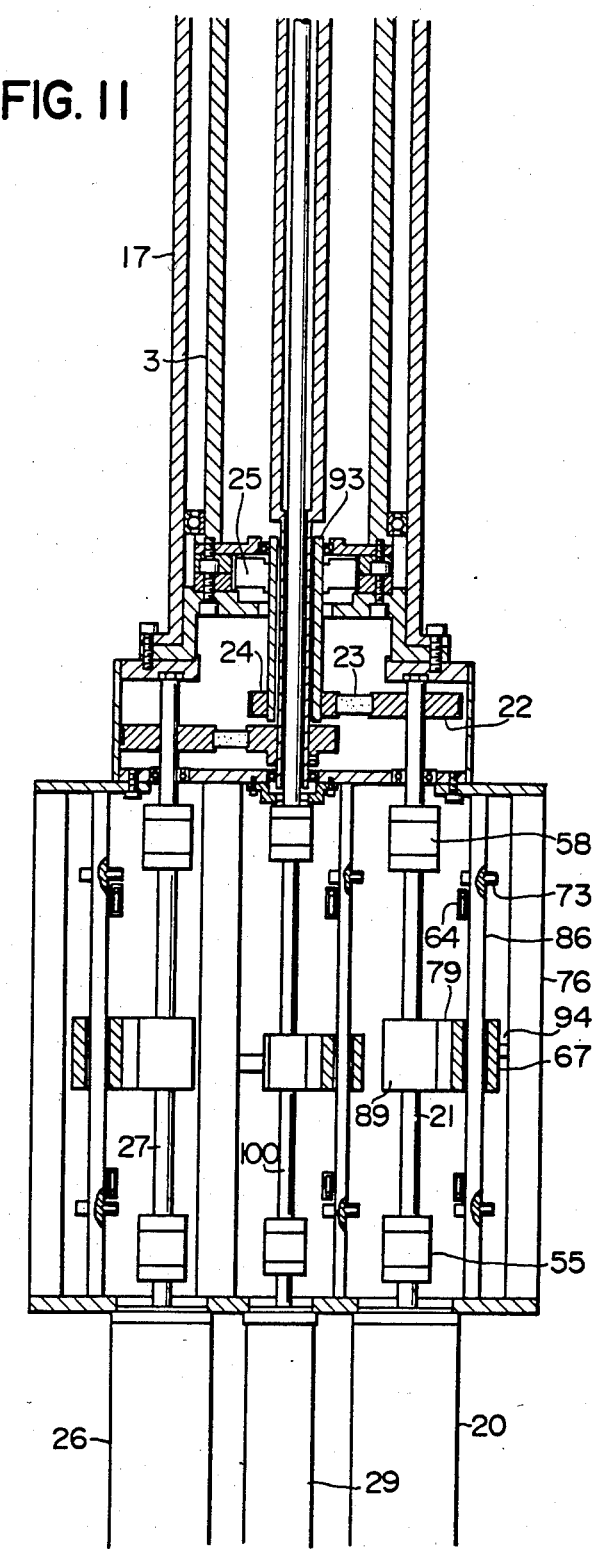
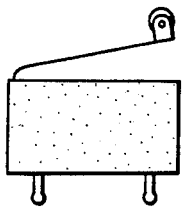

WRIST MECHANISM FOR INDUSTRIAL ROBOT

BACKGROUND OF THE INVENTION

1. Field of the Invention

The present invention relates to a wrist mechanism having two, three or more degrees of freedom and used by being disposed at the tip of a robot arm in an industrial robot.

2. Description of the Prior Art

As is well known, the major role of a wrist mechanism disposed at the tip of a robot arm is to change the posture of an object to be controlled, such as a hand, a spray gun, and a welding torch, which is secured to the wrist mechanism, and the mechanism has the functions of bending, oscillating, and twisting. The power for driving such a wrist mechanism is, in many cases, transmitted by making use of a gear train. In the case of utilizing a gear train, however, it is indispensible to adjust the backlashes of gears, and noise caused by the engagement of gears also becomes a problem.

An arrangement in which the necessary power is transmitted by making use of universal joints instead of a gear train is disclosed in Japanese Patent Unexamined Publication No. 60062/1978, according to which adjustment of backlashes becomes unnecessary and the problem of noise can be alleviated. However, the angle of intersection of input and output shafts in each universal joint changes according to a bending movement, and the universal joint is also bent at a sharp angle as the amount of the bending movement increases. This causes a burden to the universal joint, resulting in undesirably restricting the amount of its bending movement.

SUMMARY OF THE INVENTION

Accordingly, an object of the present invention is to provide a wrist mechanism for a robot making use of universal joints.

Another object of the present invention is to eliminate the burden of each universal joint used in the wrist of a robot, i.e., the burden caused by an excessive bending of the universal joint.

A still another object of the present invention is to decrease an undesirable change in a rotational phase transmitted via each universal joint.

A wrist mechanism of the present invention is provided with a first wrist member disposed rotatably on a robot arm and a second wrist member disposed rotatably on the first wrist member. A drive shaft for rotating the second wrist member is disposed on a rotational center line in the first wrist member such as to become concentric therewith. The rotational output of this drive shaft is transmitted to the second wrist member via a universal joint. The aforementioned drive shaft constitutes an input shaft for this universal joint, while the second wrist member constitutes an output shaft thereof. The angle of intersection of the two shafts does not change by the rotation of the first or the second wrist member and is constantly kept at a fixed level. For this reason, the burden on this point in the universal joint becomes equalized.

The above and other features of the present invention will become more apparent in the detailed description of the invention when the same is read in conjunction with the accompanying drawings.

BRIEF DESCRIPTION OF THE DRAWINGS

FIG. 11 an enlarged cross-sectional view illustrating the rear half of the fore arm shown in FIG. 3; and FIG. 12 is an enlarged side-elevational view illustrating a switch in the fore arm of FIG. 11.

Figure 2:
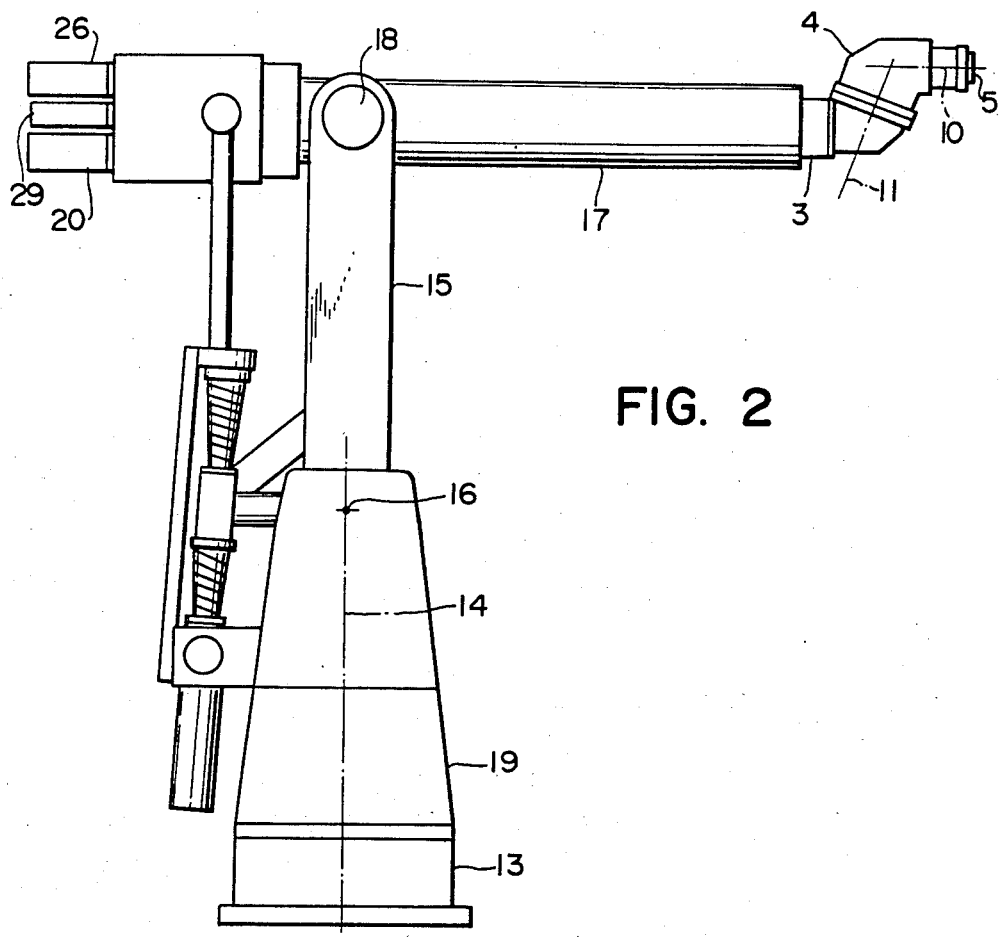
FIG. 2 is a side elevational view of an industrial robot in its entirety in which the aforementioned wrist mechanism is incorporated.

DESCRIPTION OF THE PREFERRED EMBODIMENTS:

FIG. 2 shows an overall arrangement of an industrial robot which is provided with a wrist mechanism according to an embodiment of the present invention. Shown is a vertical multi-joint type robot, wherein a rotational body 19 rotates about a center line 14 with respect to a base 13 in such a manner as to oscillate to the left and the right. Also, an upper arm 15 rotates with a shaft 16 perpendicular to the center line 14 as its center, thereby moving back and forth. A fore arm 17 rotates with a shaft 18 perpendicular to the center line 14 line its center, thereby moving vertically.

The portions of the robot up to the fore arm 17 correspond to a robot arm. The portion located forwardly of the fore arm is a wrist mechanism. A first wrist member 3 is disposed in the fore arm 17 of the robot arm rotatably relative thereto, and serves to effect a rotational motion of the entire wrist mechanism. Then, a second wrist member 4 rotates about an inclined center line 11 relative to the first wrist member 3. Finally, a third wrist member 5 rotates about a center line 10, and an object to be controlled (not shown) is installed on the end of the third wrist member 5 so as to effect various operations.

Figure 3:
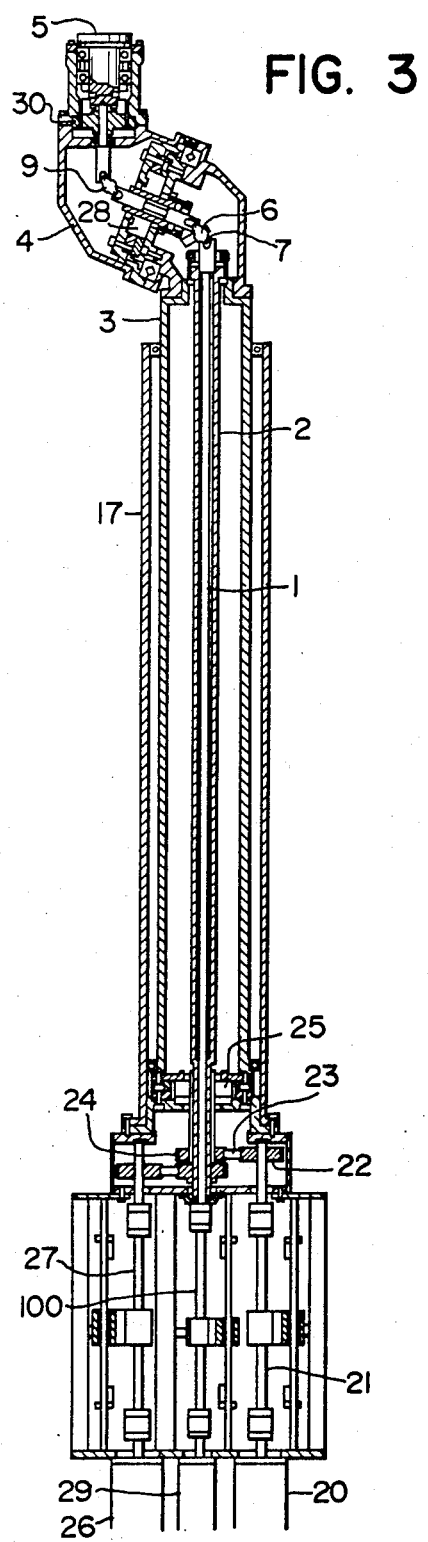
FIG. 3 is an enlarged cross-sectional view of a fore arm and the wrist mechanism in the robot of FIG. 2.

FIG. 3 shows a side cross-sectional view of the fore arm 17. The rotation of the first wrist member 3 is effected by transmitting the rotation of a motor 20 via a ball screw 21, a pulley 22, a timing belt 23, a pulley 24, and a reduction gear 25. The rotation of the second wrist member 4 is effected by transmitting the rotation of the motor 26 to a drive shaft 2 for rotating the second wrist member via a ball screw 27 and the like and further to the second wrist member via a first universal joint 6 and a reduction gear 28. The rotation of the third wrist member 5 is effected as the rotation of a motor 29 is transmitted to a drive shaft 1 for rotating the third wrist member via a ball screw 100 and inputted to a reduction gear 30 via a second and a third universal joint 7, 9.

Figure 1:
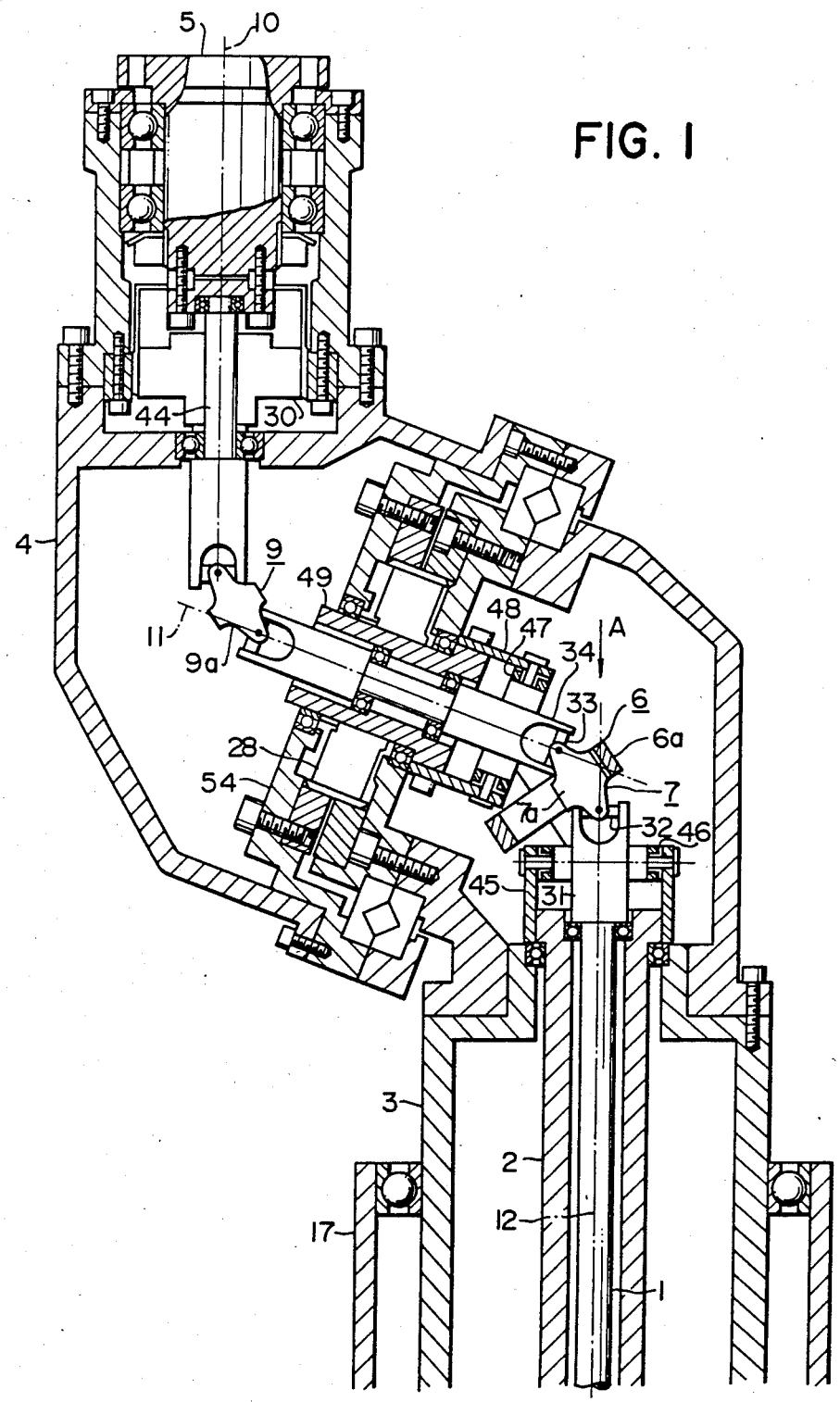
FIG. 1 is a cross-sectional view illustrating a robot wrist mechanism according to an embodiment of the present invention.
Figure 4:
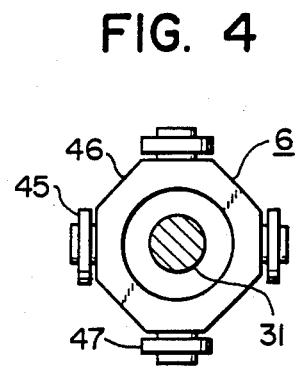
FIG. 4 is a view of a universal joint as viewed in the direction of an arrow A of FIG. 1.
Figure 5:
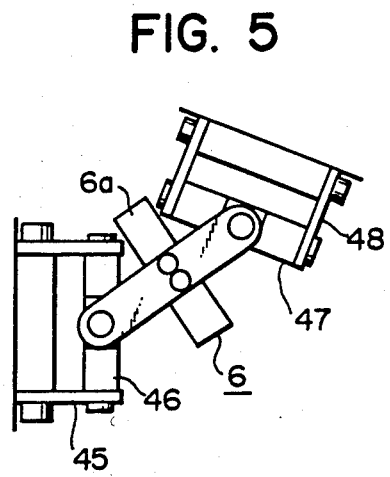
FIG. 5 is a side elevational view of the universal joint of FIG. 4.

FIG. 1 illustrates the details of the wrist mechanism. The output of the drive shaft 1 for rotating the third wrist member is transmitted to the second universal joint 7. The details of the second universal joint 7 and the like are shown in FIGS. 4 and 5. The power of the aforementioned drive shaft 1 is inputted to an input shaft 31, is then transmitted to an intermediate shaft 7a via a cruciform joint 32, and is also transmitted to an intermediate drive shaft 34 via a cruciform joint 33. The input shaft 31, the cruciform joint 32, and the intermediate shaft 7a constitute first universal joint elements with the intermediate shaft 7a serving as an output shaft. Also, the intermediate shaft 7a, the cruciform joint 33, and the intermediate drive shaft 34 constitute second universal joint elements with the intermediate drive shaft 34 serving as an output shaft. Thus, the second universal joint 7 is a composite type including the first universal joint elements 31, 32, 7a and the second universal joint elements 7a, 33, 34. This construction is similar to that of the first universal joint 6 or that of the third universal joint 9.

Next, description will be made on the first universal joint 6. The power inputted to the drive shaft 2 for rotating the second wrist member is transmitted to a cruciform joint 46 via an input shaft 45 interlinked therewith. A hole is bored in the center of the cruciform joint 46 such as to allow the input shaft 31 of the second universal joint 7 to be installed therethrough. The power inputted to the cruciform joint 46 is transmitted to an input shaft 49 of the reduction gear 28 via an intermediate shaft 6a, a cruciform joint 47, and an output shaft 48. Holes are also bored in the centers of the intermediate shaft 6a and the cruciform joint 47, respectively, so as to allow a power transmission system constituted by the second universal joint 7 to be installed therethrough. In the above-described first universal joint 6, the input shaft 45, the cruciform joint 46, and the intermediate shaft 6a constitute first universal joint elements having the intermediate shaft 6a as their output shaft, while the intermediate shaft 6a, the cruciform joint 47, and the output shaft 48 constitute second universal joint elements having the intermediate shaft 6a as their input shaft.

Figure 7:
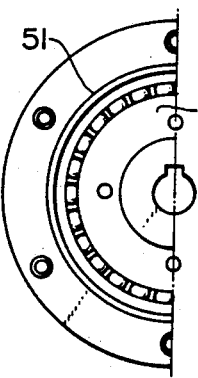
FIG. 7 is a left-hand side elevational view of the reduction gear.
Figure 6:
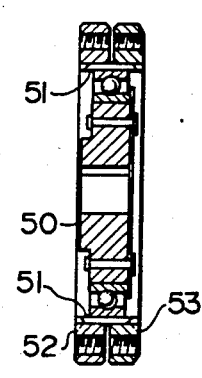
FIG. 6 is an enlarged vertical cross-sectional view of a reduction gear shown in FIG. 1.
Figure 8:
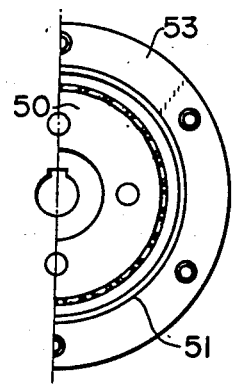
FIG. 8 is a right-hand side elevational view of the reduction gear.

FIGS. 6 to 8 show an outline of the reducing gear 28 which has the similar structure to that of the conventional differential reduction gear known as "HARMONIC DRIVE" (HARMONIC DRIVE SYSTEMS CO., LTD. Japan TYPE: FB-20-80-2). The gear 28 includes a cam 50, resilient tooth member 51, and two circular members 52, 53 which are disposed concentrically as shown FIG. 6. The cam 50 is of oval shape, and the resilient member 51 is of an annular oval shape and is formed with teeth at its outer periphery. Each of the circular members 52, 53 is formed with teeth at the inner periphery thereof. The number of the teeth of the circular member 52 is greater than that of the resilient member 51 by two, while the number of the circular member 53 is the same as that of the resilient member 51. The cam 50 and the resilient member 51 are arranged such that the former presses the latter against the circular members 52, 53 so as to resiliently engage the teeth of the member 51 with those of the member 52, 53. As a result, when the circular member 52 is fixed and the cam 50 is rotated, the speed of rotation of the resilient member 51 is reduced with respect to the circular member 52 at a ratio which is given by dividing two by the number of the teeth of the circular member 52, and is rotated in the opposite direction. Since the circular teeth 53 and the resilient teeth 51 have the same rotational angle, the speed of rotation of the outputting circular member 53 is hence reduced relative to the rotation of the inputting cam 50. As a result, the second wrist member 4 coupled with the circular member 53 of the reduction gear 28 rotates about the center line 11.

Figure 9:
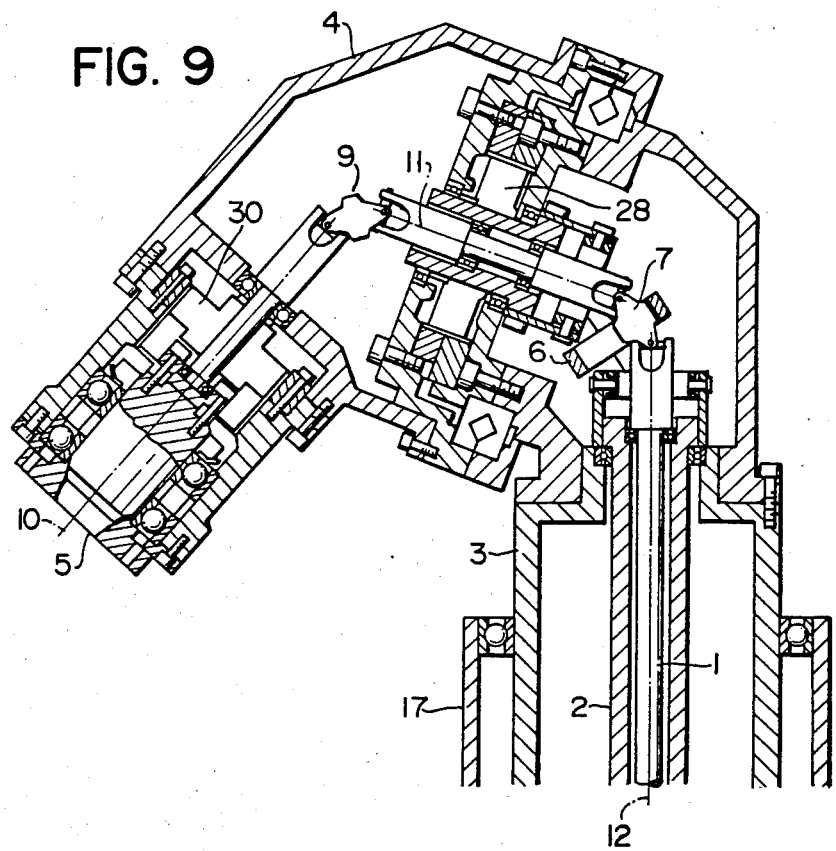
FIG. 9 is a cross-sectional view illustrating the wrist mechanism in a state after it has been moved from the state thereof shown in FIG. 1.

FIG. 9 shows the wrist mechanism in which the second wrist member 4 has been rotated by 180 degrees from the state shown in FIG. 1. In the state shown in FIG. 1, the rotational center 10 and a rotational center 12 are parallel with each other. The center 10 in FIG. 9 assumes an angle of inclination corresponding to twice the angle of intersection of the center 11 relative to the center 12. This angle is selected so as to be within a permissible range of bending of each universal joint, and in such a manner that the object which is to be controlled and is installed on the end of the third wrist member 5 will not interfere the fore arm 17 and that the object to be controlled will be able to take necessary postures. The state shown in FIG. 1 wherein the center 10 and the center 12 are parallel with each other is one condition for enabling the center 10 to take various postures in space. In case that they are not parallel, it becomes impossible for the center 10 to be oriented right forwardly. In order to make the centers 10 and 12 parallel with each other, the intersection angle of the rotational center line 11 of the second wrist member 4 relative to the rotational center line 12 of the first wrist member 3 has to agree with the intersection angle of the rotational center line 10 of the third wrist member 5 relative to the rotational center line 11 of the second wrist member 4. Each of the aforementioned angles of intersection comes to be a kind of design constant, but may take a value of 90° or less. The reason for this is that although it is necessary to direct the third wrist member 5 upwardly as viewed in FIG. 1 (forwardly of the mechanism), it is not necessary to direct the same downwardly (in the direction to the fore arm 17) as viewed in the drawing. In addition, these angles of intersection, when each is set to a value of 90° or less, are effective for reducing the burden on each universal joint 6, 7 or 9 in terms of the angle of intersection. The foregoing description of setting an angle of intersection to 90° or less can also be applied, almost as it is, to a wrist mechanism in which the third wrist member 5 is omitted, i.e. the so-called wrist mechanism of two degrees of freedom.

As can be seen from FIG. 1, there is a distance between the point of intersection of the rotational center lines 10 and 11 and that of the rotational center lines 11 and 12. This means that the rotational center lines 10 and 12 are not aligned in straight, but are offset to each other. When the center lines 10 and 12 are offset to each other, the construction of each universal joint 6, 7 or 9 can be simplified.

Although the detailed construction of the third universal joint 9 is not shown in the drawings, it has the same construction as that of the second universal joint 7, and the element denoted by reference numeral 9a corresponds to the intermediate shaft thereof. The output of the third universal joint 9 is transmitted to an input shaft 44 of the reduction gear 30 so as to finally rotates the third wrist member 5.

Figure 10:
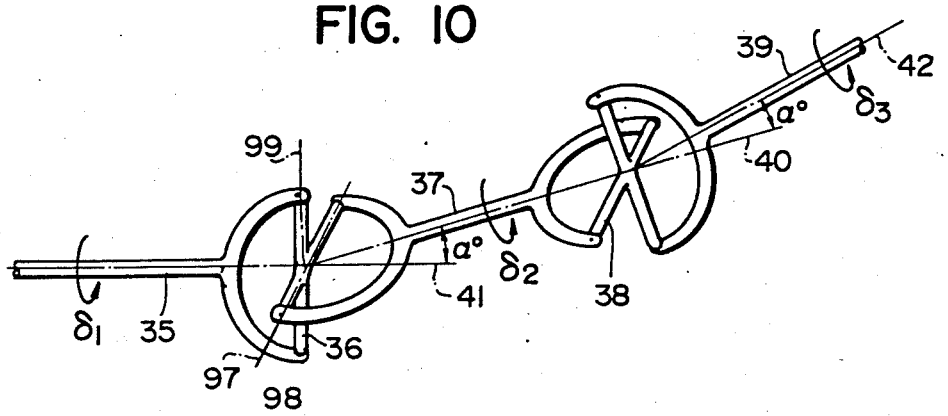
FIG. 10 is a perspective view schematically illustrating universal joints.

Each of the universal joints 6, 7 and 9 is of the composite type having the first and second universal joint elements. This construction is designed to minimize the angle of intersection of the input and output shafts of each universal joint as a whole, and also to improve the accuracy, in the rotational phase. Detailed description will be made hereinunder on the improvement of the accuracy in the rotational phase. In the second universal joint 7, for instance, when the input shaft 31 is rotated at a constant speed, the intermediate shaft 7a rotates at an inconstant speed, while the speed of the intermediate drive shaft 34 serving as the output shaft returns to a constant speed. For this reason, it becomes unnecessary to take into consideration the inconstancy in speed resulting from the use of universal joints. This can be shown as follows. FIG. 10 shows a schematic diagram of universal joints. Assuming here that the rotational angle of an intermediate shaft at the time when an input shaft 35 is rotated by $\sigma_1$ from a state as shown in FIG. 4 is $\sigma_2$, the relationship between $\sigma_1$ and $\sigma_2$ can be given as follows, where the angle formed by the rotational center line 40 of the intermediate shaft 37 and the rotational center line 41 of the input shaft 35 and that formed by the rotational center line 40 and the rotational center line 42 of an output shaft 39 are also assumed to be an equal $\alpha$.

Assuming further that in the illustrated state, the shaft 97 of a cruciform joint 36 is the X-axis, the shaft 99 thereof as the Y-axis, and the rotational center line 41 as the Z-axis, and that these axes constitute a three-dimensionally fixed coordinate system. In this case, the rotational matrix of the vector around the X, Y and Z-axes can be expressed as follows:

$$Rx(\sigma) = \begin{Bmatrix} 1 & 0 & 0 \\ 0 & \cos\sigma & -\sin\sigma \\ 0 & \sin\sigma & \cos\sigma \end{Bmatrix}$$

$$Ry(\sigma) = \begin{Bmatrix} \cos\sigma & 0 & \sin\sigma \\ 0 & 1 & 0 \\ -\sin\sigma & 0 & \cos\sigma \end{Bmatrix}$$

$$Rz(\sigma) = \begin{Bmatrix} \cos\sigma & -\sin\sigma & 0 \\ \sin\sigma & \cos\sigma & 0 \\ 0 & 0 & 1 \end{Bmatrix}$$

Assuming that a vector 98 shown in FIG. 10 and fixed to the cruciform joint 36 is represented as A, and that the intermediate shaft 37 is rotated by $\sigma_2$ when the input shaft 35 is rotated by $\sigma_1$, the vector 98, if the length of the vector 98 is set to 1, can be expressed as follows:

$$A = Rx(\alpha) \, Ry(\sigma_2) \begin{Bmatrix} 1 \\ 0 \\ 0 \end{Bmatrix}$$

At this juncture, when an angle formed by the Z-X plane and the vector 98 is assumed to be $\sigma_0$, it can be considered that the vector 98 rotates only by the angle $\sigma_0$ around the Z-axis and subsequently rotates by $\sigma_1$ around the Y-axis, so that the vector 98 can be expressed as follows:

$$A = Ry(\sigma_1) \, Rz(\sigma_0) \begin{Bmatrix} 1 \\ 0 \\ 0 \end{Bmatrix}$$

Accordingly, the following relation is given:

$$A = Rx(\alpha) \, Ry(\sigma_2) \begin{Bmatrix} 1 \\ 0 \\ 0 \end{Bmatrix} = Ry(\sigma_1) \, Rz(\sigma_0) \begin{Bmatrix} 1 \\ 0 \\ 0 \end{Bmatrix}$$

If the foregoing formula is calculated, we have:

$$\begin{Bmatrix} \cos\sigma_2 \\ \sin\alpha \, \sin\sigma_2 \\ -\cos\alpha \, \sin\sigma_2 \end{Bmatrix} = \begin{Bmatrix} \cos\sigma_1 \\ \sin\sigma \\ -\sin\sigma_1 \, \cos\sigma_0 \end{Bmatrix}$$

When the Z component is divided by the X component for both sides, we have $$\tan\sigma_1 = \cos\alpha \, \tan\sigma_2$$

Also, when the Y component is divided by the Z component for both sides, we have $$\tan\sigma_0 = \sin\sigma_1 \, \mathit{Tan\sigma}$$

Accordingly, the cruciform joint 36 performs an oscillating movement by $\pm\sigma$.

Here, assuming that the angle of rotation of the output shaft 39 caused by the aforementioned $\sigma_1$ and $\sigma_2$ is $\sigma_3$, since the rotational phase of a cruciform joint 38 relative to the cruciform joint 36 has advanced by $\pi/2$, the relationship between $\sigma_2$ and $\sigma_3$ can be expressed:

$$\tan\left(\sigma_2 + \frac{\pi}{2}\right) = \cos\alpha \, \tan\left(\sigma_3 + \frac{\pi}{2}\right).$$

Accordingly, $$\cot\sigma_2 = \cos\alpha \, \cot\sigma_3.$$

From the foregoing two formulae (the relation between $\sigma_1$ and $\sigma_2$ and that between $\sigma_2$ and $\sigma_3$, we have:

$$\tan\sigma_3 = \tan\sigma_1.$$

Thus, it is shown that the input shaft 35 and the output shaft 39 rotate at a constant speed.

The necessary condition for such a constant speed, i.e., the condition for making the rotational phases of the final input and output shafts 35, 39 agree with each other is to form the first universal joint elements 35, 36 and 37 and the second universal joint elements 37, 38 and 39 in such a way that their respective constructions are symmetrical with respect to each other as viewed from the intermediate shaft 37 which is located therebetween. Although description returns to the embodiment of the present invention shown in FIGS. 1 to 5, each of these universal joints 6, 7 and 9 meets the afore-mentioned condition, and a constant speed is maintained between the input and output shafts of each universal joint. In addition, the second universal joint 7 and the third universal joint 9 are set such that their respective structures are symmetrical with respect to each other as viewed from the intermediate drive shaft 34 (FIG. 1), also for the aforementioned reason. The term "symmetrical structure" referred to in this specification means structural symmetry, and does not impose any restriction to a change in the shape of each universal joint or each element which is irrelevant to the operational characteristics thereof.

As can be seen from FIG. 1, both the drive shaft 2 for rotating the second wrist member and the drive shaft 1 for rotating the third wrist member are disposed on the rotational center line 12 of the first wrist member 3. In addition, the intermediate drive shaft 34 for rotating the third wrist member is disposed on the rotational center line 11 of the second wrist member 4. The rotational center lines 12 and 11 determine the angle of intersection of the input and output shafts in each of the first and second universal joints, 6, 7, but these angles of intersection are irrelevant to the rotational motion of each wrist member 3, 4 or 5, and are always maintained at a fixed level. This may be also applicable to the third universal joint 9. Therefore, it is possible to rotate each of the wrist members 3, 4 and 5 freely from the respective the universal joints 6, 7 and 9, thereby determining the bending, oscillating or twisting posture of the object to be controlled which is attached to the third wrist member 5.

The drive shaft 2 is disposed on the outside of the drive shaft 1, and the first universal joint 6 is disposed on the outside of the second universal joint 7. The reason for this arrangement is to allow the rotational force of the drive shaft 1, the second universal joint 7 and the like to be transmitted past the second wrist member 4 to the third wrist member 5 located ahead of the wrist member 4.

The third wrist member 5 in this embodiment is driven directly by the reduction gear 30, while the second wrist member 4 is driven by the reduction gear 28 via a flange 54, the rotary shaft 3 being also driven directly by the reduction gear 25. This arrangement is effective for increasing the rigidity of the wrist mechanism. Furthermore, if proper lubrication is carried out, the universal joints 6, 7 and 9 can be rotated at high speed, so that the rotational speed of each of the wrist members 3, 4 and 5 can be increased.

FIG. 11 shows a detailed view of the rear portion of the fore arm 17. The rotation of the motor 20 for driving is used to rotate an input shaft 93 via a coupling 55, the ball screw 21, a coupling 58, a shaft 84, the pulley 22, the belt 23, and the pulley 24 so as to drive the reduction gear 25. As the ball screw 21 rotates, a nut 89 moves back and forth, and a ball bush 67 which is coupled to the nut 89 via a piece 79, moves also back and forth. In case that the ball screw 21 rotates continuously in the same direction, the ball bush 67 moves and, when it reaches a certain point, operates a switch 64. The external appearance of this switch 64 is shown in FIG. 12. Thus, the power of the motor 20 is cut off, but when the ball bush 67 further advances by the inertia, it strikes against a stopper 73, causing the motor 20 to stop. Incidentally, a potentiometer 67 is connected with the ball bush 67 by means of a connecting rod 94, and has a higher resolving capability than that necessary for sensing the distance of movement of the ball bush 67 caused by one turn of the motor 1. Thus, it is possible for the drive shaft 3 to have an operating angle of 360° or more. In addition, the drive shaft 3 may also be provided with an over-run switch and a mechanical stopper. The arrangements leading up to the drive shafts 1, 2 are also practically the same. Furthermore, since the present position of the nut 89 can be detected in the order of one turn of the motor 1 by means of the potentiometer 76, the adjustment for setting the start position of operation at the time of turning on the power can be completed within one turn of the motor wherever its position may be. As described above, since the wiring for the switches and the potentiometers can be formed only in the rear of the fore arm 17 without being disposed in the wrist mechanism, the wiring of cables in the wrist mechanism can be eliminated, so that the work efficiency and reliability can be improved. Moreover, the adjustment for setting the start position of operation can be performed with a minimum amount of movement of each wrist member, so that the interference of the mechanism with a work can be avoided. In addition, since the working range of the wrist mechanism can be set to 360° or more, a more complex work can be performed.

According to the above-described embodiment, the angle of intersection of the input and output shafts in each universal joint can be maintained at a fixed level, and no influence is exerted thereto by the rotation of each wrist member. For this reason, even if any change is made in the posture of the object to be controlled, no excessive burden is applied to each of the universal joints. Furthermore, since there is no need to compensate for a change in the rotational phase in accordance with a change in the angle of intersection of the universal joints, a burden in calculation on a robot controlling unit can also be reduced.

What is claimed is:

1. A wrist mechanism for an industrial robot, having a movable arm including:
    a first wrist member disposed rotatably on the robot arm;
    a second wrist member disposed rotatably on said first wrist member;
    a drive shaft rotatably mounted on the rotational center line of said first wrist member;
    universal joint means coupling said drive shaft for rotating the second wrist member;
    means mounting said second wrist member relative to said first wrist member so that the rotational center lines of both said wrist members adjustably intersect each other at an angle of 90 degrees or less; and
    said universal joint means being constituted by first universal joint elements which include as their input shaft said drive shaft for rotating said second wrist member and an intermediate shaft as an output shaft, and by second universal joint elements which include as their input shaft said intermediate shaft and, as their output shaft, said second wrist member.

2. A wrist mechanism according to claim 1, wherein said first universal joint elements and said second universal joint elements are arranged so that the respective constructions thereof are symmetrical with respect to each other as viewed from said intermediate shaft which is located therebetween.

3. A wrist mechanism for an industrial robot including a first wrist member disposed rotatably on a robot arm, a second wrist member disposed rotatably on said first wrist member, and a third wrist member disposed rotatably on said second wrist member, characterized in that a drive shaft for rotating said second wrist member is disposed on the rotational center line of said first wrist member, and said drive shaft for rotating said second wrist member is coupled with said second wrist member via a first universal joint, and that a drive shaft for rotating said third wrist member is disposed on said rotational center line of said first wrist member, said drive shaft for rotating said third wrist member is coupled with an intermediate drive shaft disposed rotatably on the rotational center line of said second wrist member via a second universal joint, and said intermediate drive shaft is coupled with said third wrist member via a third universal joint member.

4. A wrist mechanism according to claim 3, wherein said second wrist member is disposed relative to said first wrist member so that the rotational center lines of said two wrist members intersect each other at an angle of 90° or less, and said third wrist member is disposed relative to said second wrist member so that the rotational center lines of said two wrist members intersect each other at an angle of 90° or less.

5. A wrist mechanism according to claim 4, wherein the angle of intersection of said second wrist member relative to the rotational center line of said first wrist member is made to agree with the angle of intersection of the rotational center line of said third wrist member relative to the rotational center line of said second wrist member.

6. A wrist mechanism according to claim 5, wherein a predetermined distance is provided between the point of intersection of said second wrist member relative to the rotational center line of said first wrist member and the point of intersection of the rotational center line of said third wrist member relative to the rotational center line of said second wrist member.

7. A wrist mechanism according to claim 3, wherein said first universal joint and said second universal joint are disposed concentrically with respect to each other.

8. A wrist mechanism according to claim 7, wherein said drive shaft for rotating said second wrist member is disposed on the outside of said drive shaft for rotating said third wrist member, said first universal joint is disposed on the outside of said second universal joint, and said intermediate drive shaft is disposed on the inside of said second wrist member.

9. A wrist mechanism according to claim 3, wherein each of said first universal joint, said second universal joint, and said third universal joint is constituted by first universal joint elements and second universal joint elements having as an input shaft thereof said intermediate shaft which corresponds to an output shaft of said first universal joint elements.

10. A wrist mechanism according to claim 9, wherein said first universal joint elements and said second universal joint elements are disposed such that respective constructions thereof are symmetrical with respect to each other as viewed from said intermediate shaft which is disposed therebetween.

11. A wrist mechanism according to claim 5, wherein said second universal joint and said third universal joint are disposed so that constructions thereof become symmetrical with each other as viewed from said intermediate drive shaft disposed therebetween.

* * * * *